United States Patent
Sugiyama

(10) Patent No.: US 9,437,351 B2
(45) Date of Patent: Sep. 6, 2016

(54) SHIELD WIRE FOR WIRING HARNESS AND METHOD OF MAKING THE SAME

(71) Applicant: Yazaki Energy System Corporation, Minato-ku, Tokyo (JP)

(72) Inventor: Tadatoshi Sugiyama, Numazu (JP)

(73) Assignee: Yazaki Energy System Corporation, Tokyo (JP)

( * ) Notice: Subject to any disclaimer, the term of this patent is extended or adjusted under 35 U.S.C. 154(b) by 0 days.

(21) Appl. No.: 14/303,872

(22) Filed: Jun. 13, 2014

(65) Prior Publication Data

US 2015/0041176 A1 Feb. 12, 2015

(30) Foreign Application Priority Data

Aug. 6, 2013 (JP) .................................. 2013-163145

(51) Int. Cl.
| | | |
|---|---|---|
| H05K 9/00 | (2006.01) | |
| H01B 13/26 | (2006.01) | |
| H01B 13/012 | (2006.01) | |
| H02G 3/04 | (2006.01) | |

(52) U.S. Cl.
CPC ........ *H01B 13/26* (2013.01); *H01B 13/01263* (2013.01); *H02G 3/0468* (2013.01); *Y10T 29/49117* (2015.01)

(58) Field of Classification Search
CPC ... H05K 9/00; H01B 13/26; H01B 13/01263
USPC .................... 174/102 R, 108 B, 109, 102 SP
See application file for complete search history.

(56) References Cited

U.S. PATENT DOCUMENTS

| | | | | |
|---|---|---|---|---|
| 1,995,407 | A * | 3/1935 | Walker ................... | H01B 7/226 138/103 |
| 2,308,274 | A * | 1/1943 | Frederickson ......... | H01B 7/226 174/106 D |
| 5,350,885 | A * | 9/1994 | Falciglia ................ | H01B 7/365 156/50 |
| 6,906,264 | B1 * | 6/2005 | Grant et al. ................... | 174/112 |
| 7,845,069 | B2 * | 12/2010 | Franklin .............. | G02B 6/4488 29/825 |
| 2011/0247856 | A1 * | 10/2011 | Matsuda .............. | H01B 11/203 174/108 |
| 2011/0253414 | A1 * | 10/2011 | Dewberry ................ | H01B 9/02 174/102 R |
| 2012/0152589 | A1 * | 6/2012 | Kumakura ............. | H01B 11/20 174/109 |
| 2012/0273248 | A1 * | 11/2012 | Tamaki .............. | H01B 11/1025 174/102 SP |
| 2014/0238718 | A1 * | 8/2014 | Tanner ...................... | 174/102 R |

FOREIGN PATENT DOCUMENTS

JP 2004-171952 A 6/2004

* cited by examiner

*Primary Examiner* — Hoa C Nguyen
*Assistant Examiner* — Amol Patel
(74) *Attorney, Agent, or Firm* — Sughrue Mion, PLLC

(57) ABSTRACT

Disclosed is a shield wire for a wiring harness improving workability for wiring, and a method of the shield wire for a wiring harness. Forming of a shield part by winding a strip-like shield member outside of an electric wire allows work for inserting the electric wire into the shield part to be omitted, which improves workability for wiring. Forming of overlap portion where the shield part overlaps with each other in a radial direction allows the electric wire not to be exposed even if the shield electric wire for a wiring harness is bent, which prevents leak or penetration of electromagnetic wave.

4 Claims, 3 Drawing Sheets

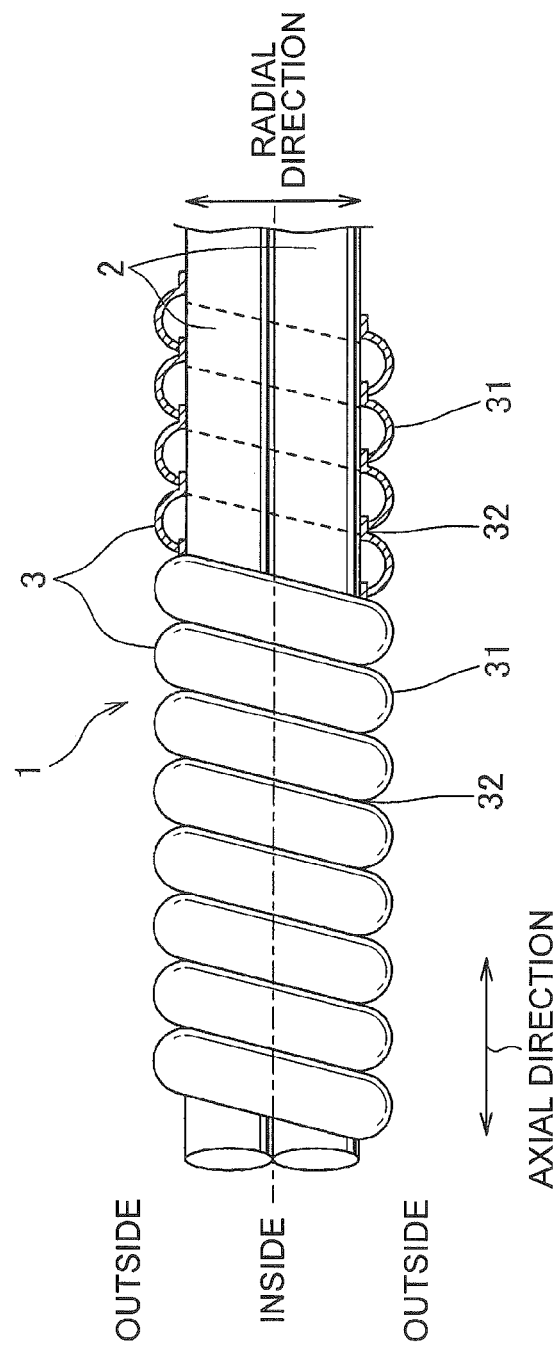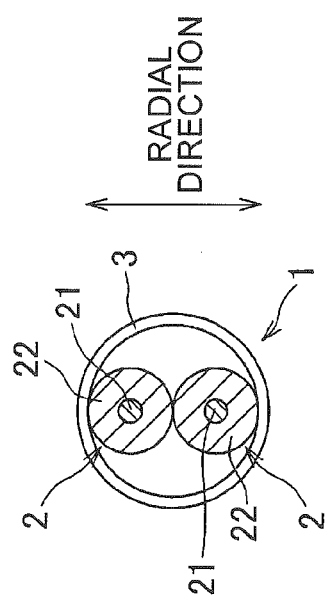

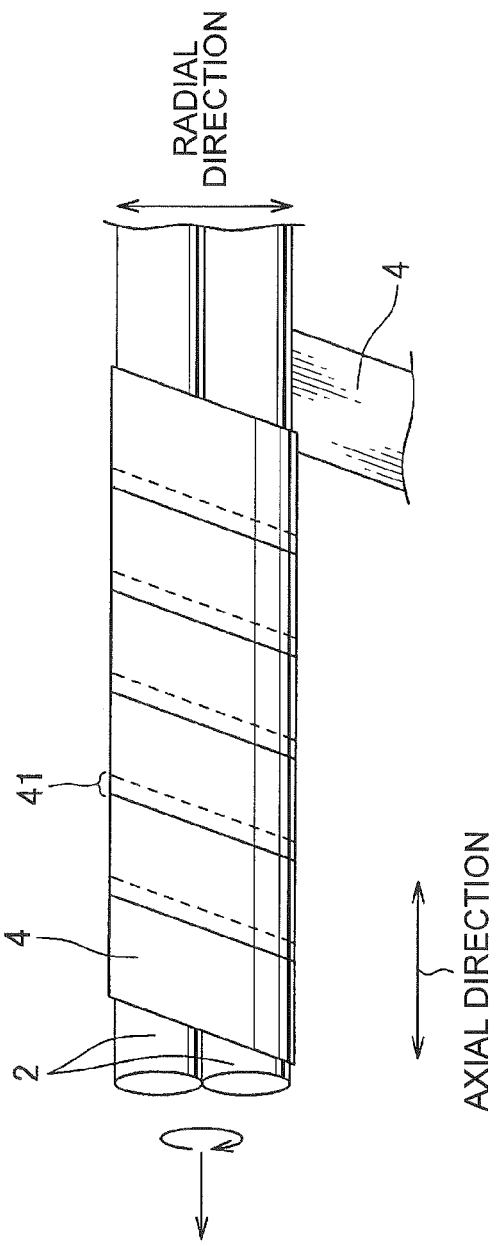

SHIELD WIRE FOR WIRING HARNESS AND METHOD OF MAKING THE SAME

CROSS REFERENCE TO RELATED APPLICATION

This application is on the basis of Japanese Patent Application NO. 2013-163145, the contents of which are hereby incorporated by reference.

TECHNICAL FIELD

This invention relates to shield wires for a wiring harnesses having shield parts covering outside of electric wires, and methods of making the shield wires for a wiring harnesses.

BACKGROUND ART

Conventionally, there has been advocated a shield wire for a wiring harness on an outside of which a shield pipe is disposed (see PTL 1, Japanese Patent Application Laid-Open Publication No. 2004-171952 for example). The shield wire for a wiring harness set forth in the reference is made to prevent by a shield pipe electromagnetic wave from leaking outward from the electric wire, or from penetrating into the electric wire from outside.

CITATION LIST

Patent Literature

[PTL 1]
Japanese Patent Application Laid-Open Publication No. 2004-171952

SUMMARY OF INVENTION

Technical Problem

Disadvantageously, in the shield wire for a wiring harness recited in the PTL 1, inserting an electric wire through a shied pipe after the shied pipe is formed causes work for inserting the electric wire to become difficult, worsening workability for wiring.

An object of the invention is to provide a shield wire for a wiring harness improving workability for wiring and a method of making the shield wire for a wiring harness.

Solution to Problem

The invention according to the present invention is related to a shield wire for a wiring harness including a shield part covering outside of an electric wire, in which the shield part is formed by winding spirally strip-like shield member such that the shield member is overlapped with each other in a radial direction and extended in an axial direction.

According to the present invention as such, forming of a shield part by winding the shield member outside the electric wire allows work for inserting the electric wire into the shield part to be omitted, improving workability of wiring. Furthermore, overlapping of the shield member with each other in the radial direction prevents the electric wire from exposing even if the shield wire for a wiring harness is bent, and thereby securely prevents leak or penetration of electromagnetic wave.

At this time, in the shield wire for a wiring harness of the present invention, the shield part is preferably provided with a spiral convex portion projecting outward in the radial direction, and continuing in the axial direction.

According to such configuration, forming of the spiral convex portion at the shield part, i.e., lining of convex and concave portions in the axial direction allows for readily bending the shield wire for a wiring harness, further improving workability of wiring of the shield wire for a wiring harness. Also, in such convex and concave portions, an overlap portion where shield members adjacent in the axial direction overlap with each other is preferably made concave, and between the overlap portions a bent portion is preferably made convex such that the shield member projects in the radial direction. Such configuration allows the winding shield member to be pressed in the axial direction, which readily forms convex and concave portions, and bending the shield wire for a wiring harness at the concave portion, i.e., the overlap portion, also prevents exposure of the electric wire.

Furthermore, the shield wire for a wiring harness of the present invention is preferably provided with a bellows-like convex portion projecting outward in the radial direction and lining in the axis direction. According to such configuration, workability of wiring the shield wire for a wiring harness as mentioned above is made further to be improved, and generally equalizing force required for bending the shield wire for a wiring harness in each direction, which further facilitates workability of wiring.

A method of making a shield wire for a wiring harness of the present invention is that of making the foregoing shield wire for a wiring harness, wherein winding a shield member outside the electric wire such that the foregoing shield member overlaps in the radial direction and extends in the axial direction, so as to form the shield part. According to such present invention, it is made possible to make the shield wire for a wiring harness having advantageous workability of wiring as mentioned above.

Advantageous Effects of Invention

According to the shield wire for a wiring harness and the method of shield wire for a wiring harness of the present invention, the shield member which is made such that the shield part is overlapped in the radial direction and is spirally wound, allows workability of wiring to be improved and prevents leak and penetration of electromagnetic wave.

BRIEF DESCRIPTION OF DRAWINGS

FIG. 1A is a side view illustrating a shield wire for a wiring harness according to an embodiment of the present invention;

FIG. 1B is a cross-sectional view illustrating a shield wire for a wiring harness according to an embodiment of the present invention;

FIG. 2 is a side view illustrating how a shield member is wound around the shield wire for a wiring harness;

DESCRIPTION OF EMBODIMENTS

Figure 3A:
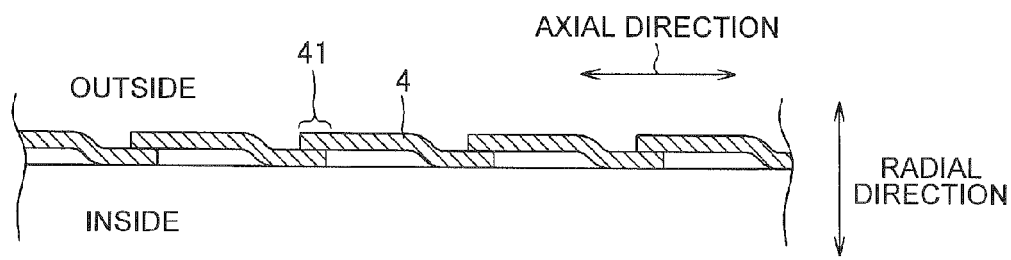
FIGS. 3A and 3B are cross-sectional views illustrating how a shield member is formed around the shield wire for a wiring harness.

Referring now to drawings, an embodiment of the present invention will be described. Note that a radial and axial directions of the present embodiment are made such that a center side of the shield wire 1 for a wiring harness in the radial direction is referred to as an inner side, and an outer side thereof an outer side, as shown in FIG. 1.

In FIG. 1, the shield wire 1 for a wiring harness of the present embodiment is provided with two electric wires 2 and a shield part 3 covering an outside of the electric wire 2.

The electric wire 2 is each provided with a pair of conductors 21, and an insulating cover 22 covering an outside of the conductor 21.

The shield part 3 is made such that a strip-like shield member 4 wound around the electric wire 2, to be mentioned later, is deformed convexly in an outward direction, in which a convex portion 31 is spirally continued in the axial direction, and at a concave portion adjacent portions overlap with each other in the radial direction.

Then, a procedure of forming the shield part 3 outside the electric wire 2 will be described. Firstly, as shown in FIG. 2, a conductive strip-like shield member 4 is fed, and the electric wire 2 is fed in the axial direction while being rotated, and thereby the shield member 4 is spirally wound outside the electric wire 2. At this time, overlapping the adjacent shield members 4 with each other in the radial direction makes an overlap portion 41 to be formed.

Figure 3B:
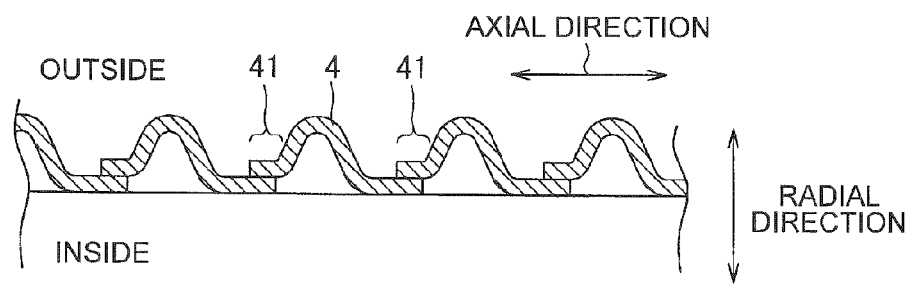
Figure 4:
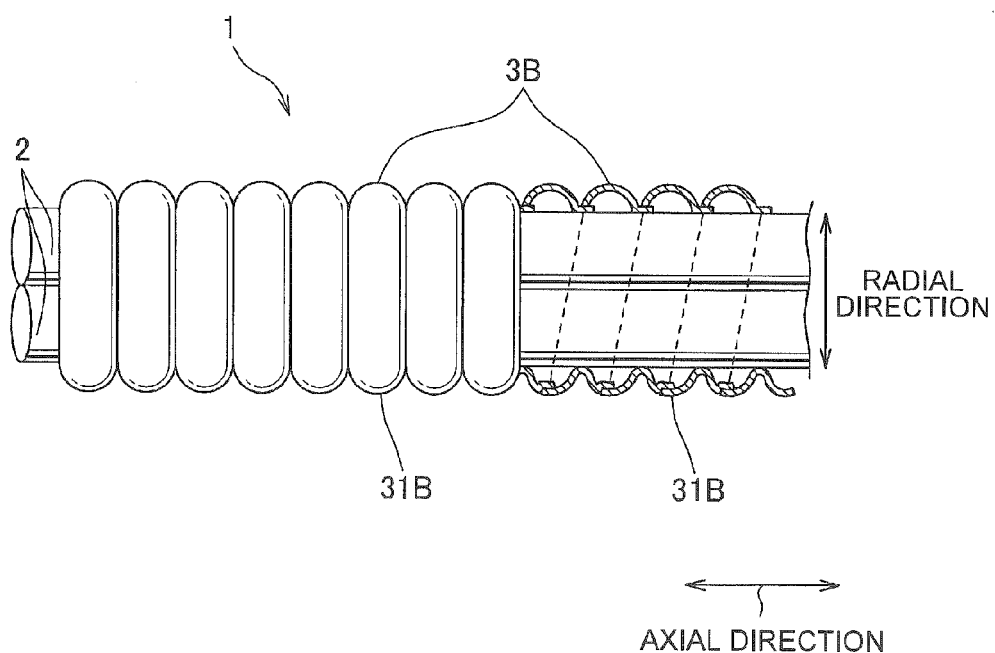
FIG. 4 is a side view illustrating a shield wire for a wiring harness according to a modified embodiment of the present invention.

Then, pressing the shield member 4 in the axial direction while preventing the overlap portion 41 from deforming outwardly in the radial direction bends and deforms the shield member 4 such as to project outward in the radial direction between the overlap portions 41 as shown in FIG. 3B. The convex portion 31 is thereby spirally continued in the radial direction, and forms the shield part 3 that are overlapped in the radial direction in the concave portion 32.

According to such present embodiment, there are such effects as mentioned below. Namely, the shield part 3 is formed by winding the shield member 4 outside the electric wire 2, leading to omission of work of inserting the electric wire 2 into the shield part 3, and improvement of workability of wiring. Overlapping of the shield member 4 (namely, the shield part 3) with each other in the radial direction also makes the electric wire 2 not to be exposed even if the shield wire 1 for a wiring harness is bent, securely preventing leak or penetration of electromagnetic wave.

Furthermore, forming of the convex portion 31 and the concave portion 32 outside the shield part 3 allows the shield wire 1 for a wiring harness to be readily bent, improving workability of wiring the shield wire 1 for a wiring harness.

Furthermore, bending the shield member 4 such that the overlap portion 41 becomes the concave portion 32 allows the convex portion 31 and concave portion 32 to be readily formed in the shield part 3.

Note that the present invention is not limited to the foregoing embodiment but includes other configurations to achieve an object of the present invention, and includes modifications as well, as mentioned below. For example, in the forgoing embodiment while the convex portion 31 formed in the shield part 3 is made to continue spirally in the axis direction, the shield part 3B may be provided with a bellows-like convex portion 31B lining in the axis direction. According to such configuration, it is made possible to equalize force required for bending the shield wire 1 for a wiring harness in each direction, and thereby further improving workability of wiring.

Furthermore, while in the foregoing embodiment bending and deforming the shield member 4 such that the overlap portion 41 becomes the concave portion 32 forms the shield part 3, the shield member 4 may be bent and deformed such that the overlap portion 41 becomes the convex portion 31. According to such configuration, it is made possible to reduce deformation of the shield member 4, compared to the configuration that apart excepting the overlapping portion 41 is deformed convexly.

Furthermore, while in the foregoing embodiment the shield member 4 is pressed in the axial direction so as that the shield part 3 is formed with the concave portion 32 and convex portion 31, the convex and concave portions are, for example, molded by pressing an adequate die after the shield member 4 is wound, or are molded by passing the electric wire 2 and the shield member 4 rotated and fed in the axial direction through an adequate die, or are formed by winding the shield member preliminarily bent around the electric wire 2. It may be possible, omitting molding the convex and concave portions, for the wound shield member 4 to serve as the shield part.

Note that while the best configuration and method for performing the present invention are disclosed in the foregoing descriptions, the present invention is not limited thereto. Namely, while the present invention is specifically illustrated with regards to specific embodiment, and is described, such various modifications are made as shape, material, quantity and other detailed configuration by the skilled parson in the art for the foregoing embodiments without departing from technical spirit and scope of object. Accordingly, since descriptions limiting such shape and material disclosed above are those illustrated in order to understand the present invention, but not intended to limit the present invention, the descriptions using component name removing partially or wholly such as shape or material should be construed as being included therein.

REFERENCE SIGNS LIST 1 shield wire for a wiring harness
2 electric wire
3 shield part
4 shield member
31 convex portion

The invention claimed is:

1. A shield wire for a wiring harness, comprising:
 a shield part covering an outside of an electric wire including a conductor and an insulating cover covering an outside of the conductor, the shield part being spirally wound directly on the outside of the insulating cover such that a flat strip-like shield member is extended in an axial direction while being overlapped with each other in a radial direction, wherein
 the shield part is provided with a convex portion projecting outward in the radial direction by pressing the shield part in the axial direction.

2. The shield wire for a wiring harness as claimed in claim 1, wherein the convex portion is formed spirally.

3. The shield wire for a wiring harness as claimed in claim 1, wherein the convex portion is formed into a bellows-like shape.

4. A method of making the shield wire for a wiring harness as claimed in claim 1, comprising the step of:
 forming the flat strip-like shield part by winding spirally the shield member directly on the outside of the insulating cover of the electric wire such that the shield member overlaps with each other in the radial direction and extends in the axial direction;

pressing the shield part in the axial direction so as to form a convex portion projecting outward in the radial direction.

* * * * *